(12) United States Patent
Chen et al.

(10) Patent No.: US 10,775,233 B2
(45) Date of Patent: *Sep. 15, 2020

(54) OPTICAL SENSING MODULE AND ELECTRONIC APPARATUS

(71) Applicant: PixArt Imaging Inc., Hsin-Chu County (TW)

(72) Inventors: Hui-Hsuan Chen, Hsin-Chu County (TW); Jia-Hong Huang, Hsin-Chu County (TW); Tien-Chia Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,647

(22) Filed: Nov. 12, 2018

(65) Prior Publication Data

US 2019/0078931 A1   Mar. 14, 2019

Related U.S. Application Data

(63) Continuation of application No. 14/274,855, filed on May 12, 2014, now Pat. No. 10,168,205.

(30) Foreign Application Priority Data

Jul. 5, 2013   (TW) .............................. 102124340 A

(51) Int. Cl.
*G01J 1/04* (2006.01)
*G01J 1/02* (2006.01)
*G01J 1/42* (2006.01)

(52) U.S. Cl.
CPC ............ *G01J 1/0411* (2013.01); *G01J 1/0242* (2013.01); *G01J 1/0437* (2013.01); *G01J 1/0477* (2013.01); *G01J 1/42* (2013.01)

(58) Field of Classification Search
CPC ...... G01J 1/0411; G01J 1/0242; G01J 1/0437; G01J 1/0477; G01J 1/42
USPC ......................................................... 250/393
See application file for complete search history.

(56) References Cited

U.S. PATENT DOCUMENTS

| 5,512,997 A | * | 4/1996 | Ogawa | G01C 3/085 356/3.04 |
| 5,559,639 A | * | 9/1996 | Nakagishi | G02B 26/0883 359/813 |
| 6,862,147 B1 | * | 3/2005 | Sonstroem | G02B 23/12 359/619 |
| 7,385,710 B1 | * | 6/2008 | Sturgill | G01B 11/06 356/632 |

(Continued)

*Primary Examiner* — Taeho Jo
(74) *Attorney, Agent, or Firm* — Hauptman Ham, LLP

(57) ABSTRACT

An optical sensing module including a lens and a sensing device is provided. The lens has an optical axis. The sensing device is disposed under the lens, wherein the sensing device is to receive an object beam passing the lens. The optical axis of the lens deviates from a geometric center of the sensing device. An optical sensing module including a prism film, a sensing device and a lens is further provided. The prism film has a plurality of prisms. The sensing device is disposed under the prism film, wherein the sensing device is to receive an object beam sequentially passing the prism film and the lens. The lens is disposed between the prism film and the sensing device.

17 Claims, 5 Drawing Sheets

(56) References Cited

U.S. PATENT DOCUMENTS

| | | | |
|---|---|---|---|
| 8,279,178 B2* | 10/2012 | Krishnan | G06F 3/03543 178/18.09 |
| 9,784,838 B1* | 10/2017 | Shpunt | G01S 7/4817 |
| 2005/0236553 A1* | 10/2005 | Noto | H01L 31/02327 250/208.1 |
| 2006/0104065 A1* | 5/2006 | Lee | F21V 7/0016 362/341 |
| 2006/0227838 A1* | 10/2006 | Hata | H01S 5/4043 372/50.124 |
| 2007/0007439 A1* | 1/2007 | Nuebling | F21V 5/04 250/216 |
| 2007/0069109 A1* | 3/2007 | Lee | H01L 27/14621 250/208.1 |
| 2007/0126898 A1* | 6/2007 | Feldman | G02B 13/0035 348/294 |
| 2007/0164111 A1* | 7/2007 | Wang | G06K 7/10722 235/454 |
| 2007/0222916 A1* | 9/2007 | Kohara | G02B 6/0071 349/65 |
| 2008/0062149 A1* | 3/2008 | Baruk | G06F 3/0421 345/175 |
| 2008/0116379 A1* | 5/2008 | Teder | B60S 1/0822 250/341.1 |
| 2008/0117531 A1* | 5/2008 | Asper | G02B 27/0944 359/710 |
| 2008/0137071 A1* | 6/2008 | Chow | G01B 11/026 356/73 |
| 2009/0250642 A1* | 10/2009 | Liu | H04N 1/028 250/552 |
| 2010/0183200 A1* | 7/2010 | Wu | G06K 9/00046 382/127 |
| 2010/0278480 A1* | 11/2010 | Vasylyev | G02B 3/005 385/33 |
| 2010/0295773 A1* | 11/2010 | Alameh | H04W 4/21 345/156 |
| 2010/0295781 A1* | 11/2010 | Alameh | G06F 3/017 345/158 |
| 2011/0128220 A1* | 6/2011 | Bynum | G06F 3/0317 345/157 |
| 2011/0133941 A1* | 6/2011 | Yao | G01J 1/0271 340/600 |
| 2011/0221599 A1* | 9/2011 | Hogasten | H01L 27/14609 340/632 |
| 2011/0317150 A1* | 12/2011 | Decoux | G07D 7/121 356/73 |
| 2012/0132788 A1* | 5/2012 | Findlay | G01J 1/0422 250/208.2 |
| 2012/0133956 A1* | 5/2012 | Findlay | H01L 31/125 356/614 |
| 2012/0162794 A1* | 6/2012 | Lee | G02B 13/0085 359/824 |
| 2012/0261474 A1* | 10/2012 | Kawashime | G02B 7/32 235/462.24 |
| 2013/0075595 A1* | 3/2013 | Ruh | G01S 17/04 250/221 |
| 2013/0153755 A1* | 6/2013 | Pikkujamsa | G01V 8/20 250/221 |
| 2013/0153772 A1* | 6/2013 | Rossi | G01J 1/0411 250/353 |
| 2014/0061308 A1* | 3/2014 | Madej | G07G 1/0018 235/440 |
| 2014/0072003 A1* | 3/2014 | Matsumoto | B23K 26/046 372/26 |
| 2014/0130855 A1* | 5/2014 | Gu | H01L 31/0549 136/255 |
| 2014/0252213 A1* | 9/2014 | Ruh | G01D 5/26 250/227.11 |
| 2014/0376005 A1* | 12/2014 | Aoki | G01S 17/46 356/614 |

* cited by examiner

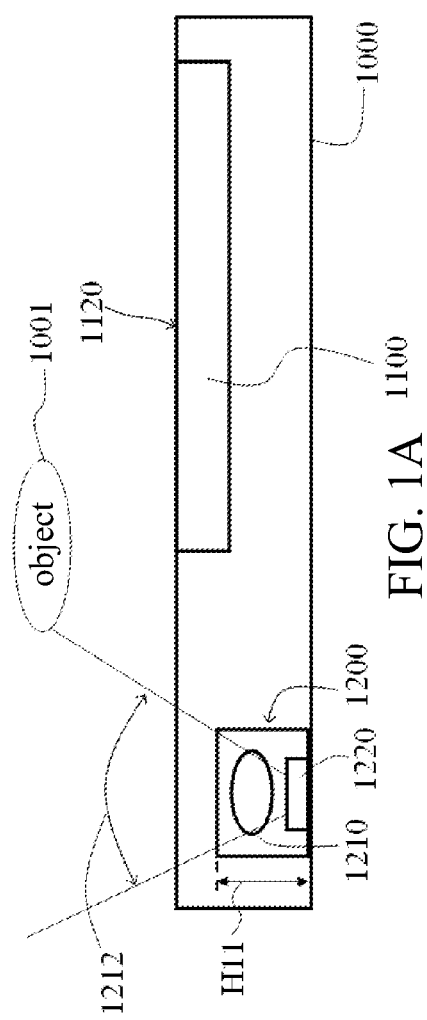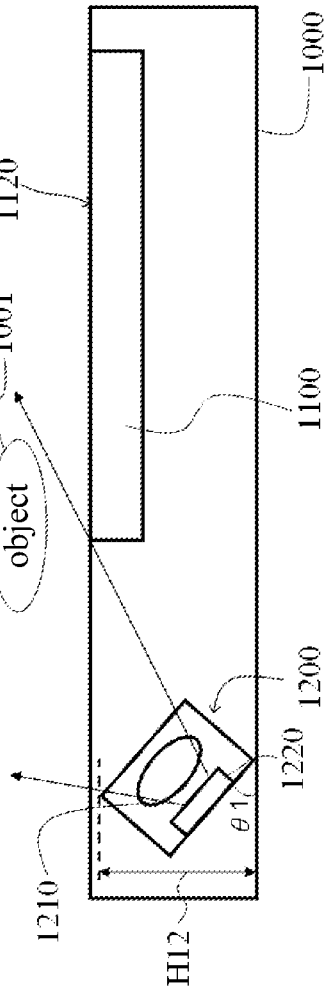
FIG. 1A (Prior Art)
FIG. 1B (Prior Art)

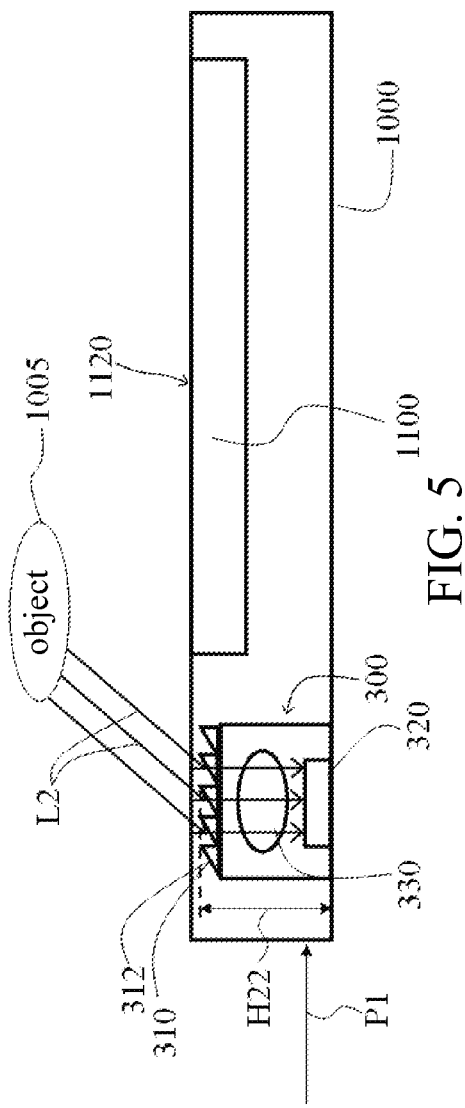
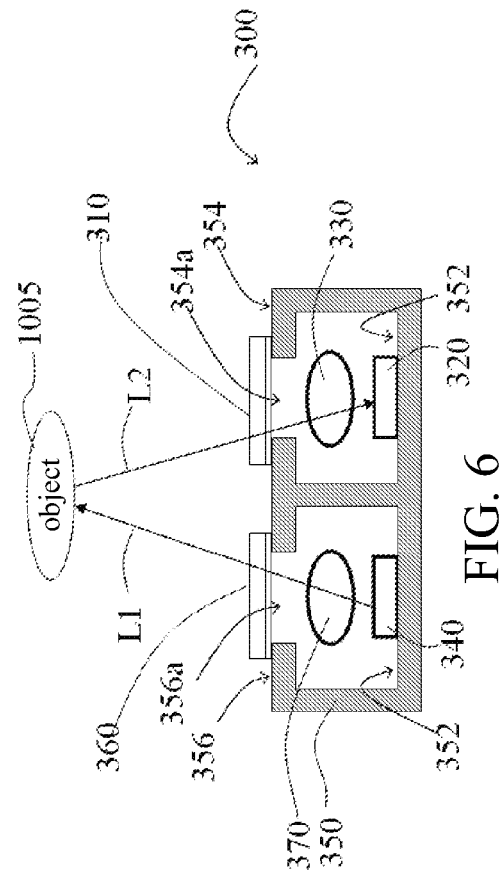

OPTICAL SENSING MODULE AND ELECTRONIC APPARATUS

CROSS REFERENCE TO RELATED APPLICATION

The present application is a continuation application of U.S. Ser. No. 14/274,855, filed on May 12, 2014, which is based on and claims priority to Taiwanese Application Number 102124340, filed on Jul. 5, 2013, the disclosure of which is hereby incorporated by reference herein in its entirety.

BACKGROUND

1. Field of the Disclosure

This disclosure generally relates to a sensing module and an electronic apparatus and, more particularly, to an optical sensing module and an electronic apparatus.

2. Description of the Related Art

FIG. 1A shows a cross-sectional view of the traditional electronic apparatus using a conventional optical sensing module to perform the object detection. Referring to FIG. 1A, the conventional electronic apparatus 1000 includes a display device 1100 and an optical sensing module 1200. The display device 1100 has a display surface 1120, wherein the display surface is configured to show images to be displayed. The optical sensing module 1200 includes a lens 1210 and an image sensing device 1220. Generally speaking, the optical sensing module 1200 has a sensing range 1212 through the use of the lens 1210. That is, when an object 1001 enters the sensing range 1212, it can be imaged onto the image sensing device 1220 through the lens 1210. In this manner, the optical sensing module 1200 can perform the identification, such as the gesture recognition, according to the images captured by the image sensing device 1220.

For current hand-held electronic apparatuses 1000 (e.g. the cell phone or tablet computer), the optical sensing module 1200 is generally disposed at the upper peripheral of the display device 1100. The term "upper peripheral" herein is referred to the upper side of the display surface 1120 when the user holds the hand-held electronic apparatus 1000 correctly, e.g. the front camera being disposed at the upper side of the display surface for current smart phones.

However, when the optical sensing module 1200 is used to detect the hand motion, the user generally waves his/her hand right in front of the display surface 1120 due to his/her habit of hand waving. Accordingly, if it is desired to improve the effective sensing range of the optical sensing module 1200, the optical sensing module 1200 needs to be tilted by an angle θ1 such that the original sensing range 1212 may be as close to the front of the display surface 1120 as possible, as shown in FIG. 1B. Although this is possible to improve the detection of the hand waving motion of the user in front of the display surface 1120 by the optical sensing module 1200, as the optical sensing module 1200 has to be tilted so that the thickness H12 required by the optical sensing device 1200 inside the electronic apparatus 1000 is increased, the original thickness H11 is increased to H12 as shown in FIGS. 1A and 1B. In other words, it is not possible to effectively reduce the total thickness of the electronic apparatus 1000 by using this kind of design.

SUMMARY

The present disclosure provides an optical sensing module that may effectively detect an object in a lateral direction through proper optical design.

The present disclosure further provides an electronic apparatus that incorporates the aforementioned optical sensing module thereby effectively improving the detection of the object in front of a display surface and maintaining a thin total thickness.

One embodiment of the present disclosure provides an optical sensing module including a light source, a sensing device and a lens. The light source is adapted to provide a radiation beam emergent from the optical sensing module. The sensing device is disposed with a displacement from the light source. The lens is disposed above the light source and having an optical axis, and the optical axis of the lens is not passing through a geometric center of the light source. The lens has a light incident plane, a light emergent plane opposite to the light incident plane, and a connecting plane connecting the light incident plane and the light emergent plane, and an included angle between the connecting plane and the optical axis is larger than 0 degree and smaller than 75 degrees to reduce an area of the optical sensing module along a direction perpendicular to a direction from the light source to the sensing device.

Another embodiment of the present disclosure further provides an electronic apparatus including a main body, a sensing device and a lens. The main body has a display device. The sensing device is disposed inside the main body and on a plane of the main body of the electronic apparatus. The lens is disposed inside the main body above the sensing device and having an optical axis, the optical axis extending through a geometric center of the lens and vertical to the plane of the main body. The optical axis of the lens is offset, along a direction perpendicular to a direction parallel to a side of the display device, from the sensing device towards the side of the display device of the electronic apparatus by a predetermined distance. The lens has a light incident plane, a light emergent plane opposite to the light incident plane, and a connecting plane which is a cutting surface connecting the light incident plane and the light emergent plane to reduce an area along a horizontal direction by removing a part of the lens.

The present disclosure further provides an electronic apparatus including a main body, a light source and a lens. The main body has a display device. The light source is disposed inside the main body and on a plane of the main body of the electronic apparatus. The lens is disposed inside the main body above the light source and having an optical axis, the optical axis extending through a geometric center of the lens and vertical to the plane of the main body. The optical axis of the lens is offset, along a direction perpendicular to a direction parallel to a side of the display device, from the light source towards the side of the display device of the electronic apparatus by a predetermined distance. The lens has a light incident plane, a light emergent plane opposite to the light incident plane, and a cutting surface connecting the light incident plane and the light emergent plane to reduce an area along a horizontal direction by removing a part of the lens.

In one aspect of the present disclosure, a shortest distance W1 between the optical axis of the first lens and the geometric center of the sensing device is substantially between 0.2 mm and 0.4 mm.

In one aspect of the present disclosure, the optical sensing module further includes a light source, wherein the light source is adapted to provide a radiation beam emergent from the optical sensing module. When the radiation beam transmits to an object, the object is adapted to reflect the radiation beam to become the object beam.

In one aspect of the present disclosure, the optical sensing module further includes a housing, wherein the housing has a bottom surface and a light incident surface opposite to the bottom surface. The sensing device and the first lens are inside the housing, and the sensing device is disposed on the bottom surface. The first lens is between the sensing device and the light incident surface. In one aspect of the present disclosure, the light incident surface has a light incident hole. In one aspect of the present disclosure, the optical sensing module further includes a light source, wherein the light source is disposed inside the housing and adapted to provide a radiation beam emergent from the optical sensing module. When the radiation beam transmits to an object, the object is adapted to reflect the radiation beam to become the object beam.

In one aspect of the present disclosure, the optical sensing module further includes a prism film which includes a plurality of prisms, wherein the radiation beam from the light source is adapted to sequentially pass through a second lens and the prism film and emerge from the optical sensing module, and the second lens is between the prism film and the light source.

In one aspect of the present disclosure, the optical sensing module further includes a second lens having an optical axis and disposed above the light source, and the optical axis of the second lens does not pass through a geometric center of the light source, and the radiation beam from the light source is adapted to pass through the second lens and emerge from the optical sensing module.

In one aspect of the present disclosure, the housing further has a light emergent surface opposite to the bottom surface and adjacent to the light incident surface. The radiation beam is adapted to emerge from the optical sensing module via the light emergent surface. In one aspect of the present disclosure, the light emergent surface has a light emergent hole.

In one aspect of the present disclosure, the lens has a light incident plane, a light emergent plane opposite to the light incident plane and at least one connecting plane, and the connecting plane connects the light incident plane and the light emergent plane.

In one aspect of the present disclosure, an angle of each of the first prisms is substantially between 20 degrees and 43 degrees. In one aspect of the present disclosure, an angle of each of the first prisms is substantially between 32 degrees and 34 degrees.

In one aspect of the present disclosure, the optical sensing module further includes a light source, wherein the light source is adapted to provide a radiation beam emergent from the optical sensing module. When the radiation beam transmits to an object, the object is adapted to reflect the radiation beam to become the object beam.

In one aspect of the present disclosure, the optical sensing module further includes a housing, wherein the housing has a bottom surface and a light incident surface opposite to the bottom surface. The sensing device and the first lens are inside the housing, and the sensing device is disposed on the bottom surface. The first lens is between the sensing device and the light incident surface. In one aspect of the present disclosure, the light incident surface has a light incident hole. In one aspect of the present disclosure, the optical sensing module further includes a light source, wherein the light source is disposed inside the housing and adapted to provide a radiation beam emergent from the optical sensing module, wherein when the radiation beam transmits to an object, the object is adapted to reflect the radiation beam to become the object beam.

In one aspect of the present disclosure, the optical sensing module further includes a second prism film which includes a plurality of second prisms, wherein the radiation beam from the light source is adapted to sequentially pass through a second lens and the second prism film and emerge from the optical sensing module, and the second lens is between the second prism film and the light source.

In one aspect of the present disclosure, the optical sensing module further includes a second lens having an optical axis and disposed above the light source, and the optical axis of the second lens does not pass through a geometric center of the light source, and the radiation beam from the light source is adapted to pass through the second lens and emerge from the optical sensing module.

In one aspect of the present disclosure, the housing further has a light emergent surface opposite to the bottom surface and adjacent to the light incident surface. The radiation beam is adapted to emerge from the optical sensing module via the light emergent surface. In one aspect of the present disclosure, the light emergent surface has a light emergent hole.

The optical sensing module according to one embodiment of the present disclosure may change a sensing range of the optical sensing module by deviating the lens such that the optical sensing module may still have a better sensing performance without increasing the thickness of an electronic apparatus when being applied to the electronic apparatus. In addition, the sensing range of the optical sensing module may be changed by the optical design of the prism film such that the optical sensing module may have a better sensing performance without increasing the thickness of an electronic apparatus when being applied to the electronic apparatus.

BRIEF DESCRIPTION OF THE DRAWINGS

Other objects, advantages, and novel features of the present disclosure will become more apparent from the following detailed description when taken in conjunction with the accompanying drawings.

FIG. 1A shows a cross-sectional view of the traditional electronic apparatus using a conventional optical sensing module to perform the object detection.

FIG. 1B shows a cross-sectional view of the electronic apparatus of FIG. 1A in which the optical sensing module performs the object detection with a tilted angle.

FIG. 5 shows a cross-sectional view of the optical sensing module applied to an electronic apparatus according to an embodiment of the present disclosure.

FIG. 6 shows a partial perspective view along the direction P1 in FIG. 5.

DETAILED DESCRIPTION OF THE EMBODIMENT

Figure 2:
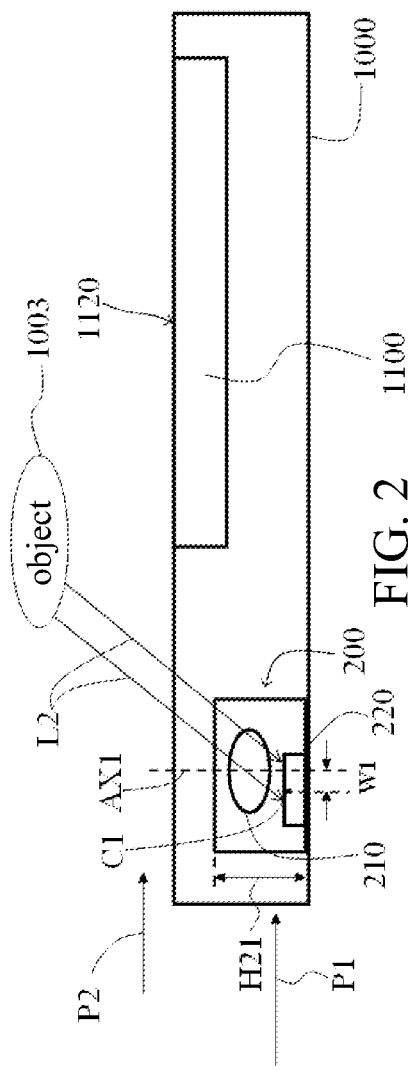
FIG. 2 shows a cross-sectional view of the optical sensing module applied to an electronic apparatus according to an embodiment of the present disclosure.
Figure 3:
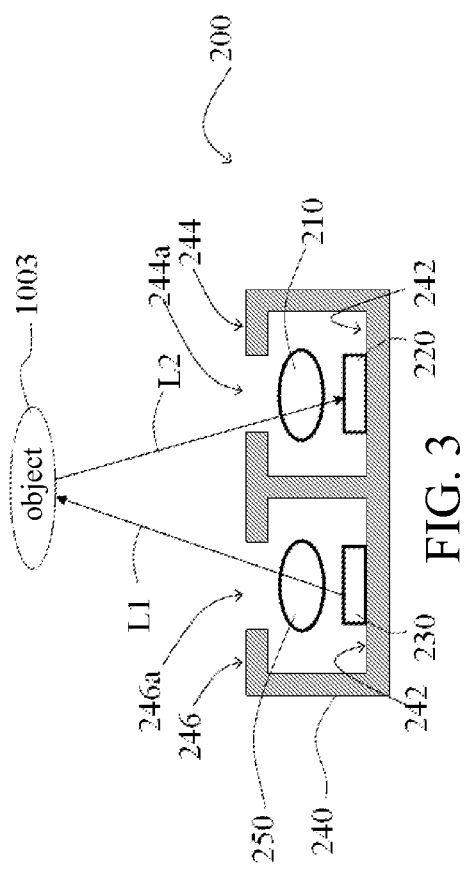
FIG. 3 shows a partial perspective view along the direction P1 in FIG. 2.

FIG. 2 shows a cross-sectional view of the optical sensing module applied to an electronic apparatus according to an embodiment of the present disclosure. FIG. 3 shows a partial perspective view along the direction P1 in FIG. 2. For illustration purpose, FIG. 3 does not show the electronic apparatus and the display device of FIG. 2. Referring to FIGS. 2 and 3 together, the optical sensing module 200 of this embodiment includes a first lens 210 and a sensing device 220. The first lens 210 has an optical axis AX1. In this embodiment, the first lens 210 may be a spherical lens or non-spherical lens, wherein a spherical lens is taken as an example in this embodiment, but not limited thereto.

The sensing device 220 is disposed under the first lens 120, wherein the sensing device 220 is adapted to receive an object beam L2 passing through the first lens 210, as shown in FIGS. 2 and 3. In this embodiment, the sensing device 220 may be implemented by the complementary metal-oxide-semiconductor (CMOS) image sensor or charge-coupled device (CCD) image sensor, wherein a CMOS image sensor is taken as an example in this embodiment, but not limited thereto. Specifically speaking, the optical sensing module 200 of this embodiment may include a light source 230, wherein the light source 230 is adapted to provide a radiation beam L1 emergent from the optical sensing module 200. In this manner, when the radiation beam L1 transmits to an object 1003, the object 1003 is adapted to reflect the radiation beam L1 to become the object beam L2. In this embodiment, the object 1003 is exemplarily illustrated by the user's hand or other hand-held objects, but not limited thereto. In addition, the light source 230 may be implemented by invisible light sources, e.g. the infrared light source or UV light source, wherein an infrared light source is taken as an example herein, but not limited thereto. It should be mentioned that in order to be able to detect the object beam L2, the sensing device 220 may select the image sensor for sensing invisible light, e.g. the infrared image sensor.

Referring to FIGS. 2 and 3 continuously, the optical axis AX1 of the first lens 210 does not pass through a geometric center C1 of the sensing device 220. Specifically speaking, for general optical design the optical axis AX1 of the first lens 210 is aligned with the geometric center C1 of the sensing device 220 such that the image imaging on the sensing device can have a better imaging quality and symmetry, wherein the geometric center C1 of the sensing device 220 herein is referred to a geometric center of the pixel matrix. However, in order to overcome the problem mentioned in the prior art, the optical axis AX1 of the first lens 210 in the optical sensing module 200 of this embodiment is deviated from the geometric center C1 of the sensing device 110 such that the object beam L2 received by the first lens 210 may be closer to the range in front of a display surface 1120 of the display device 1100 of an electronic apparatus 1000. In other words, the sensing range of the optical sensing module 200 may be closer to the right direction of FIG. 2 than that of the optical sensing module 100. In this manner, a better sensing performance may be achieved without increasing the thickness H21 of the optical sensing module 200 (i.e. the thickness H21 may be identical or similar to the thickness H11) when the user generally performs the hand waving in front of the display surface 1120. In order to achieve a better sensing quality and keep the length of the optical sensing module 200 along the horizontal direction P2, the shortest distance W1 between the optical axis AX1 of the first lens 210 and the geometric center C1 of the sensing device 220 may be substantially between 0.2 mm and 0.4 mm.

In addition, the optical sensing module 200 may include a housing 240, wherein the housing 240 has a bottom surface 242 and a light incident surface 244 opposite to the bottom surface 242, as shown in FIG. 3. In this embodiment, the sensing device 220 and the first lens 210 are located inside the housing 240, and the sensing device 220 is disposed on the bottom surface 242. The first lens 210 is located between the sensing device 220 and the light incident surface 244, wherein the light incident surface 244 may have a light incident hole 244a for receiving the object beam L2 reflected by the object 1003.

In this embodiment, the aforementioned light source 230 may also be disposed inside the housing 240 and on the bottom surface 242, wherein the housing 240 may have a light emergent surface 246 opposite to the bottom surface 242 and adjacent to the light incident surface 244 such that the radiation beam L1 provided by the light source 230 may emerge from the optical sensing module 200 via the light emergent hole 246a of the light emergent surface 246. In addition, due to the optical design of the optical sensing module 200 mentioned above, the sensing range of the optical sensing module 200 may be closer to the right direction of FIG. 2 than that of the optical sensing module 100. In order to allow the radiation beam L1 to also illuminate the same sensing range, the optical sensing module 200 of this embodiment may further include a second lens 250, wherein the second lens 250 has an optical axis AX2 and is disposed above the light source 230. Similarly, the optical axis AX2 of the second lens 250 does not pass through a geometric center of the light source 230, wherein the geometric center of the light source 230 is referred to a geometric center of the light emitting diode. In this manner, when the radiation beam L1 from the light source 230 passes through the second lens 250 and emerges from the optical sensing module 200, the radiation beam L1 may be closer to the range in front of the display surface or the right direction of FIG. 2 as the sensing range mentioned above.

Figure 4:
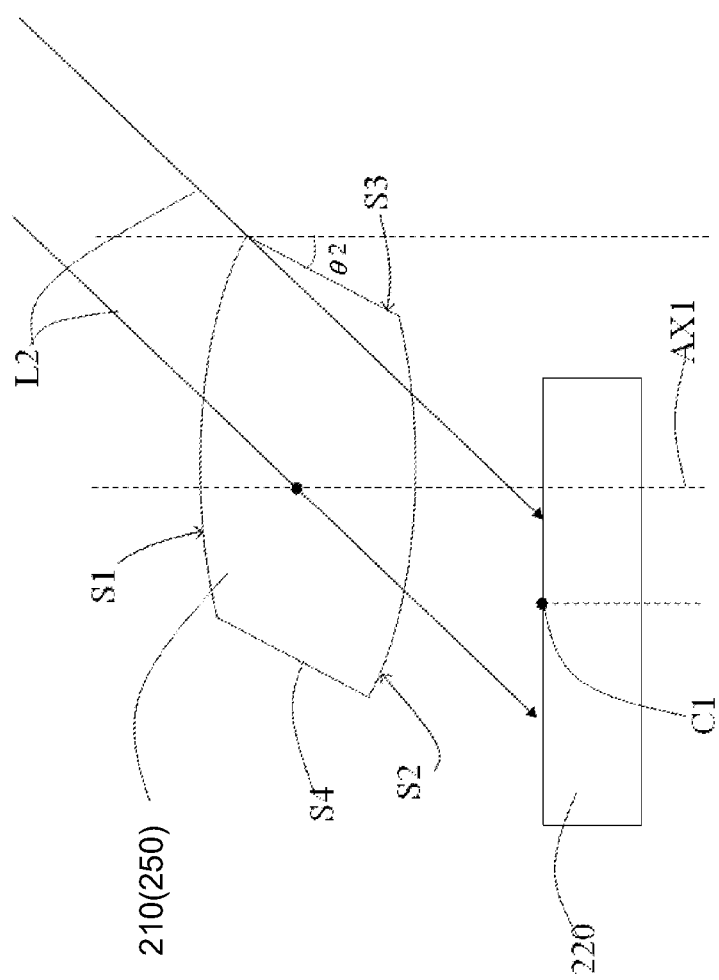
FIG. 4 shows a schematic diagram of another embodiment of the first lens and the second lens of FIG. 2.

In another embodiment, in order to further save the total area of the optical sensing module 200 along the horizontal direction P2 and not to affect the sensing quality, unnecessary part of the first lens 210 and the second lens 250 may be removed so as to further reduce the total area of the optical sensing module 200 in the horizontal direction P2. Specifically speaking, the first lens 210 and the second lens 250 may respectively have a light incident plane S1, a light emergent plane S2 opposite to the light incident plane S1 and at least one connecting plane S3, wherein the connecting plane S3 is configured to connect the light incident plane S1 and the light emergent plane S2. In this embodiment, the connecting plane S3 may be a cutting surface. In addition, in order to achieve a better imaging quality and have a smaller area along the horizontal direction P2, the included angle θ2 between the connecting plane S3 and the optical axis is substantially larger than 0 degree and smaller than or equal to 75 degrees, as shown in FIG. 4.

Figure 7:
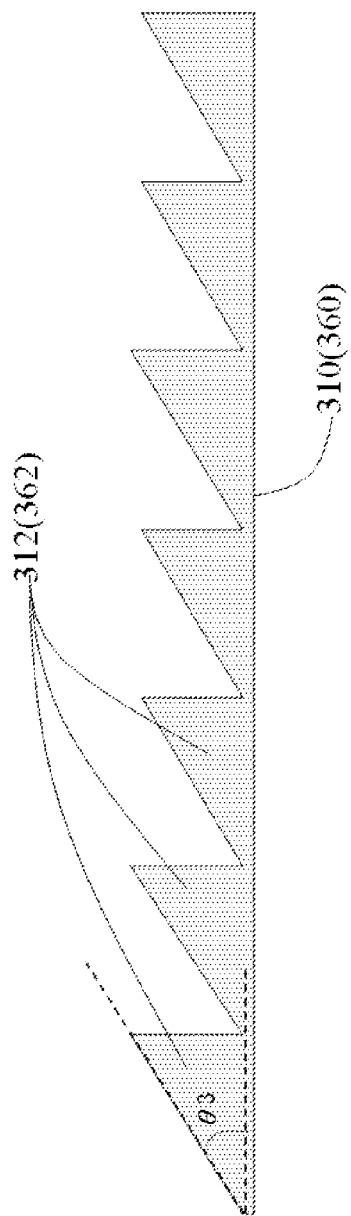
FIG. 7 shows a partially enlarged view of the prism film used in FIGS. 5 and 6.

FIG. 5 shows a cross-sectional view of the optical sensing module applied to an electronic apparatus according to an embodiment of the present disclosure. FIG. 6 shows a partial perspective view along the direction P1 in FIG. 5. FIG. 7 shows a partially enlarged view of the prism film used in FIGS. 5 and 6. For illustration purpose, FIG. 6 does not show the electronic apparatus and display device of FIG. 5. Referring to FIGS. 5 and 6 together, the optical sensing module 300 of this embodiment includes a first prism film 310, a sensing device 320 and a first lens 330. The first prism film 310 has a plurality of first prisms 312. In this embodiment, the first prisms 312 may be prism stripes or prism pillars arranged continuously or non-continuously, wherein in this embodiment continuously arranged prism stripes 312 are taken as an example, but not limited thereto. In addition, the angle θ3 of every first prism 312 may be substantially between 20 degrees and 43 degrees.

The sensing device 320 is disposed under the first prism film 310, wherein the sensing device 320 is adapted to receive an object beam L2 passing through the first prism film 310 and the first lens 330 in order, as shown in FIGS. 5 and 6. In this embodiment, the sensing device 320 may be implemented by the complementary metal-oxide-semiconductor (CMOS) image sensor or charge-coupled device (CCD) image sensor, wherein a CMOS image sensor is taken as an example in this embodiment, but not limited thereto. Specifically speaking, the optical sensing module 300 of this embodiment may include a light source 340, wherein the light source 340 is adapted to provide a radiation beam L1 emergent from the optical sensing module 300. In this manner, when the radiation beam L1 transmits to an object 1005, the object 1005 is adapted to reflect the radiation beam L1 to become the object beam L2. In this embodiment, the object 1005 is exemplarily illustrated by the user's hand or other hand-held objects, but not limited thereto. In addition, the light source 340 may be implemented by invisible light sources, e.g. the infrared light source or UV light source, wherein an infrared light source is taken as an example herein, but not limited thereto. It should be mentioned that in order to be able to detect the object beam L2, the sensing device 320 may select the image sensor for sensing invisible light, e.g. the infrared image sensor.

Referring to FIGS. 5 and 6 continuously, similarly in order to overcome the problem mentioned in the prior art, the optical sensing module 300 of this embodiment may refract the object beam L2 coming from the front of a display surface 1120 of the display device 1100 of an electronic apparatus 1000 by the aforementioned first prism film 310 to inside the optical sensing module 300. That is, the optical sensing module 300 of this embodiment may change the entire light collecting direction by disposing the first prism film 310 so that incoming light from a predetermined direction may be collected as much as possible thereby having a better sensing performance without increasing the total thickness H22 of the optical sensing module 300. Specifically speaking, the angle θ3 of every first prism 312 may be substantially between 20 degrees and 43 degrees, wherein when the aforementioned angle θ3 is smaller than 20 degrees, the object beam L2 is over-refracted by the first prism 312 to deviate from the position of the sensing device 320, i.e. the object beam L2 not being able to effectively impinge onto the sensing device 320; similarly, when the aforementioned angle θ3 is larger than 43 degrees, the object beam L2 is under-refracted by the first prism 312 and cannot effectively impinge onto the sensing device 320. In one preferred embodiment, the angle θ3 of every first prism 312 may be substantially between 32 degrees and 34 degrees. In this embodiment, the lens 330 is disposed between the first prism film 310 and the sensing device 320 and configured to image the object beam refracted by the first prism film 310 onto the sensing device 320. It should be mentioned that the first lens 330 may optionally use the design in the aforementioned optical sensing module 200.

In addition, the optical sensing module 300 may further include a housing 350, wherein the housing 350 has a bottom surface 352 and a light incident surface 354 opposite to the bottom surface 352, as shown in FIG. 6. In this embodiment, the sensing device 320 and the first lens 330 are located inside the housing 350, and the sensing device 320 is disposed on the bottom surface 352. The first lens 330 is located between the sensing device 320 and the light incident surface 354, wherein the light incident surface 354 may have a light incident hole 354a for receiving the object beam L2 reflected by the object 1005.

In this embodiment, the aforementioned light source 340 may also be disposed inside the housing 350 and on the bottom surface 352, wherein the housing 350 has a light emergent surface 356 opposite to the bottom surface 352 and adjacent to the light incident surface 354 such that the radiation beam L1 provided by the light source 340 may emerge from the optical sensing module 300 via the light emergent hole 356a of the light emergent surface 356. In addition, due to the optical design of the prism film 310 of the optical sensing module 300 mentioned above, the sensing range of the optical sensing module 300 may be closer to the right direction of FIG. 5 than that of the traditional optical sensing module 100 without increasing too much thickness. Therefore, in order to allow the radiation beam L1 to also illuminate the same sensing range, the optical sensing module 300 of this embodiment may further include a second prism film 360, wherein the second prism film 360 includes a plurality of second prisms 362. In this manner, when the radiation beam L1 from the light source 340 sequentially passes through a second lens 370 and the second prism film 360 and emerges from the optical sensing module 300, the radiation beam L1 may be closer to the front of the display surface or the right direction of FIG. 5 as aforementioned sensing range. In should be mentioned that besides the separated arrangement of the first prism film 310 and the second prism film 360 shown in FIG. 6, in one embodiment the first prism film 310 and the second prism film 360 may be integrally formed, i.e. one prism film may be directly disposed to replace both the first prism film 310 and the second prism film 360.

In other embodiments not shown herein, the second lens 250 of the aforementioned optical sensing module 200 may not be deviated. The design of deviating the second lens 250 may be replaced by incorporating the aforementioned second prism film 360 above the second lens 250. Similarly, a second prism film 360 may not be disposed above the second lens 370 of the optical sensing module 300 but the second lens 370 has a deviation.

As mentioned above, the optical sensing module according to an embodiment of the present disclosure has at least the following advantages. Firstly, a sensing range of the optical sensing module is changed by deviating the lens such that when the optical sensing module is applied to an electronic apparatus, the optical sensing module may still have a better sensing performance without increasing the thickness of the electronic apparatus. In addition, a sensing range of the optical sensing module is also changed according to the optical design of the prism film such that when the optical sensing module is applied to an electronic apparatus, the optical sensing module may still have a better sensing performance without increasing the thickness of the electronic apparatus.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensing module, comprising:
a light source adapted to provide a radiation beam emergent from the optical sensing module;

a sensing device disposed with a displacement from the light source; and a lens disposed above the light source and having an optical axis, and the optical axis of the lens not passing through a geometric center of the light source, wherein the lens has a light incident plane, a light emergent plane opposite to the light incident plane, and a connecting plane connecting the light incident plane and the light emergent plane and formed by cutting a part of the lens at an edge along a direction perpendicular to a direction from the light source to the sensing device, and the connecting plane is inclined toward the direction perpendicular to the direction from the light source to the sensing device by an included angle between the connecting plane and the optical axis larger than 10 degrees and smaller than 75 degrees to reduce an area of the optical sensing module along the direction perpendicular to the direction from the light source to the sensing device.

2. The optical sensing module as claimed in claim 1, wherein the geometric center of the light source is a geometric center of a light emitting diode thereof.

3. The optical sensing module as claimed in claim 1, wherein the light source is an infrared light source.

4. The optical sensing module as claimed in claim 1, further comprising:

a housing having a bottom surface and a light incident surface opposite to the bottom surface, wherein the sensing device is inside the housing, and the sensing device is disposed on the bottom surface.

5. The optical sensing module as claimed in claim 4, wherein the light incident surface has a light incident hole.

6. The optical sensing module as claimed in claim 4, wherein the light source is disposed inside the housing, and when the radiation beam transmits to an object, the object is adapted to reflect the radiation beam to become an object beam.

7. The optical sensing module as claimed in claim 6, wherein the housing further has a light emergent surface opposite to the bottom surface and adjacent to the light incident surface, and the radiation beam is adapted to emerge from the optical sensing module via the light emergent surface.

8. The optical sensing module as claimed in claim 7, wherein the light emergent surface has a light emergent hole.

9. The optical sensing module as claimed in claim 1, further comprising:

a prism film disposed above the sensing device and comprising a plurality of prisms each having an angle from 20 degrees to 43 degrees between a bottom edge and a bevel edge thereof.

10. The optical sensing module as claimed in claim 9, further comprising another lens disposed between the prism film and the sensing device.

11. The optical sensing module as claimed in claim 1, further comprising another prism film disposed above the light source.

12. An electronic apparatus, comprising:

a main body having a display device;

a sensing device disposed inside the main body and on a plane of the main body of the electronic apparatus; and a lens disposed inside the main body above the sensing device and having an optical axis, the optical axis extending through a geometric center of the lens and vertical to the plane of the main body, wherein the optical axis of the lens is offset, along a direction perpendicular to a direction parallel to a side of the display device, from the sensing device towards the side of the display device of the electronic apparatus by a predetermined distance, and the lens has a light incident plane, a light emergent plane opposite to the light incident plane, and a connecting plane which is a cutting surface connecting the light incident plane and the light emergent plane to reduce an area along the direction perpendicular to the side of the display device by removing a part of the lens at an edge towards the side of the display device, wherein the connecting plane is inclined toward the side of the display device by an angle larger than 10 degrees and smaller than 75 degrees.

13. The electronic apparatus as claimed in claim 12, wherein the lens has another connecting plane connecting the light incident plane and the light emergent plane, the connecting plane does not overlap the sensing device in a direction vertical to the plane of the main body, and the another connecting plane overlaps the sensing device in the direction vertical to the plane of the main body.

14. The electronic apparatus as claimed in claim 12, wherein the predetermined distance is between 0.2 mm and 0.4 mm.

15. An electronic apparatus, comprising:

a main body having a display device;

a light source disposed inside the main body and on a plane of the main body of the electronic apparatus;

a lens disposed inside the main body above the light source and having an optical axis, the optical axis extending through a geometric center of the lens and vertical to the plane of the main body, wherein the optical axis of the lens is offset, along a direction perpendicular to a direction parallel to a side of the display device, from the light source towards the side of the display device of the electronic apparatus by a predetermined distance, and the lens has a light incident plane, a light emergent plane opposite to the light incident plane, and a cutting surface connecting the light incident plane and the light emergent plane to reduce an area along the direction perpendicular to the side of the display device by removing a part of the lens at an edge towards the side of the display device, wherein the cutting surface is inclined toward the side of the display device by an angle larger than 10 degrees and smaller than 75 degrees.

16. The electronic apparatus as claimed in claim 15, wherein the predetermined distance is between 0.2 mm and 0.4 mm.

17. The electronic apparatus as claimed in claim 15, wherein the predetermined distance is from a geometric center of a light emitting diode of the light source.

\* \* \* \* \*